United States Patent [19]

Toronto et al.

[11] Patent Number: 5,662,346
[45] Date of Patent: Sep. 2, 1997

[54] PEDAL MECHANISM FOR CYCLE AND EXERCISE EQUIPMENT

[75] Inventors: Salvatore Toronto, LaJolla; Paul Novak, San Diego, both of Calif.

[73] Assignee: NovaTor, L.L.C., San Diego, Calif.

[21] Appl. No.: 654,170

[22] Filed: May 28, 1996

Related U.S. Application Data

[62] Division of Ser. No. 191,586, Feb. 4, 1994, Pat. No. 5,551,718.

[51] Int. Cl.$^6$ ..................................................... B62M 1/04
[52] U.S. Cl. ........................ 280/252; 280/258; 280/261; 280/238
[58] Field of Search ............................... 280/252, 253, 280/255, 256, 257, 258, 259, 260, 261, 236, 237, 238

[56] References Cited

U.S. PATENT DOCUMENTS

| | | | |
|---|---|---|---|
| 2,286,154 | 6/1942 | Norred | 280/258 |
| 4,108,459 | 8/1978 | Alvigini | 280/258 X |
| 4,829,841 | 5/1989 | Ogawa | 280/253 X |
| 5,390,773 | 2/1995 | Proia | 280/253 X |
| 5,435,583 | 7/1995 | Foster, Jr. | 280/237 |

FOREIGN PATENT DOCUMENTS

| | | | |
|---|---|---|---|
| 127260 | 4/1948 | Australia | 280/253 |
| 3624797 | 1/1988 | Germany | 280/252 |
| 56660 | 7/1944 | Netherlands | 280/258 |
| 17811 | 10/1896 | United Kingdom | 280/258 |
| 2065576 | 7/1981 | United Kingdom | 280/252 |
| 2219261 | 12/1989 | United Kingdom | 280/252 |

*Primary Examiner*—Kevin Hurley
*Attorney, Agent, or Firm*—Lane, Aitken & McCann

[57] ABSTRACT

The invention discloses a pedal mechanism for a bicycle or a piece of exercise equipment which allows one to impart forward motion to the drive wheel of the bicycle through an alternating or stair climbing pedalling motion. The downward force of one of the pedals causes the other pedal to move in the opposite direction. Depending on the position of the pedals, many different pedalling patterns are possible.

21 Claims, 6 Drawing Sheets

5,662,346

PEDAL MECHANISM FOR CYCLE AND EXERCISE EQUIPMENT

This application is a divisional of application Ser. No. 08/191,586 filed Feb. 4, 1994 U.S. Pat. No. 5,551,718.

This invention relates to pedal powered devices and in particular to bicycles and pedal powered exercise equipment.

BACKGROUND OF THE INVENTION

Bicycle riding is excellent exercise. Vigorous biking is wonderful for general body health in that it produces increased heart pumping to supply increased blood to the large leg muscles. There is not the constant leg impact associated with jogging.

In the basic bicycle design, a chain sprocket on the rear wheel of the bicycle is driven by a bicycle chain through a chain sprocket powered by a pedal shaft driven by the legs and feet of the bicyclist operating on a pair of bicycle pedals attached to the pedal shaft.

For the typical bicycle to move in the forward direction, the bicyclist applies force to the pedals causing them to rotate in the same rotational direction as the wheels of the bicycle for forward motion. (This rotational direction is hereinafter referred to as the "forward direction". The reverse direction is hereinafter referred to as the "reverse direction". In some cases we will refer to rotational direction of various parts of the bicycle as either clockwise or counter-clockwise. In such cases it will be assumed that we are viewing the bicycle from its right side, and in all of the figures we will be viewing the bicycle and the bicycle parts from the right side.) Typical bicycles in use today do not operate in reverse. For these bicycles the pedals can be rotated in the counter-clockwise direction when the bicycle is moving forward, but such motion provides no force to the wheels of the bicycle. Thus, with prior art bicycles, force can be applied to the wheels of the bicycle only by rotating the pedals in the forward direction. Normally force is applied to the rear wheel only on the downward stroke of the pedals; however it is fairly common practice for bicyclists to clamp their shoes to the pedals. Then force can also be applied to the rear wheel on the upward stroke of the pedals.

With prior art bicycles there is no way to apply forward force to the wheels of the bicycle with a reverse motion of the pedals. Such an improvement would increase the value of the bicycle as an exercise device and also provide an alternate method of propulsion emphasizing use of different leg and related muscles which would increase endurance for long bike trips.

What is needed is a bicycle mechanism which will permit the bicyclist to apply forward driving force to the wheels of the bicycle with both forward and reverse motion of the pedals to obtain these performance enhancements.

SUMMARY OF THE INVENTION

The present invention provides a bicycle attachment to permit a forward force to be applied to the bicycle's drive wheel by reverse rotation of the bicycle's pedals in addition to permitting a forward force to be applied to the back wheel by a forward rotation of said pedals. A preferred embodiment allows each pedal to be simultaneously rotated in opposite directions.

The present invention is well suited to provide a wide range of exercise routines for the user in order to tone thighs, hamstrings, calves, abdominal, back and various upper front and side-body muscles. The invention provides reverse conventional pedaling, forward reciprocal pedaling, reverse reciprocal pedaling, kangaroo or pogo-stick pedaling, and counter (alternating forward and backward) pedaling.

The invention is unobtrusive, and barely visible from the right side of the bicycle. It is very light weight and can be easily installed on most existing bicycles or incorporated into the design of new bicycles.

DETAILED DESCRIPTION OF PREFERRED EMBODIMENTS

Forward Motion with Forward or Reverse Pedaling

Figure 1A:
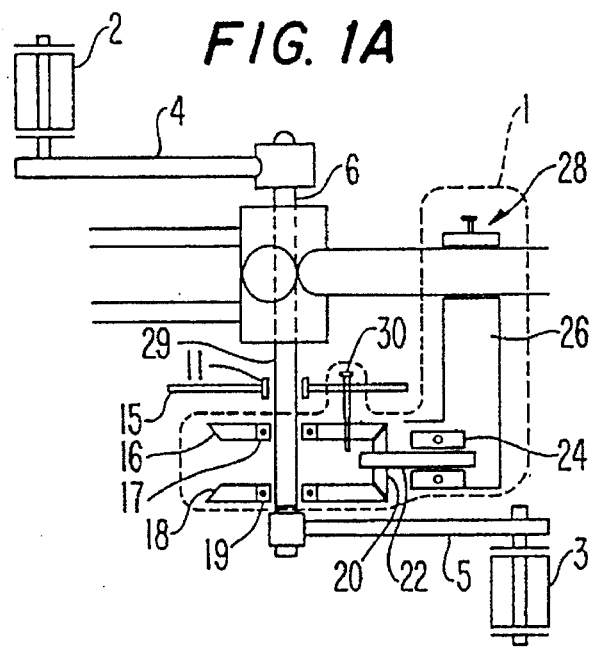
FIG. 1A is a top view of a bicycle frame and crankshaft shown partially in section with first embodiment of the present invention incorporated thereon.
Figure 1B:
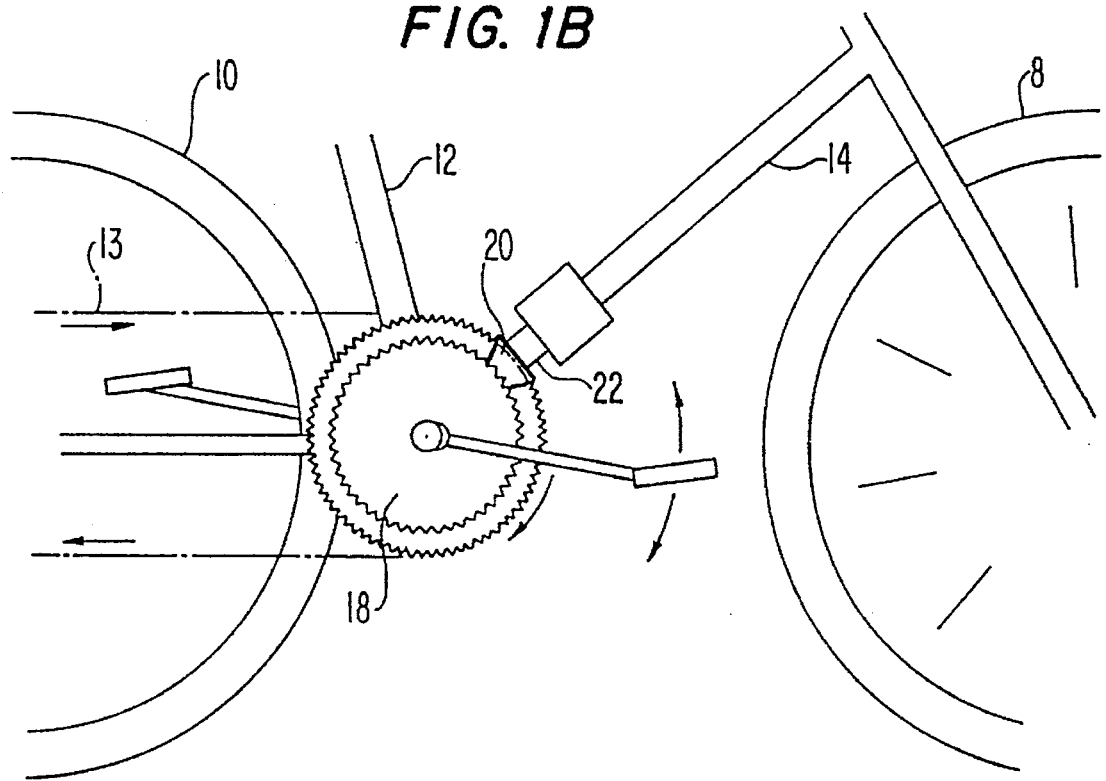
FIG. 1B is a side view of the bicycle frame and crankshaft of FIG. 1.

FIGS. 1A and 1B illustrate an embodiment of the present invention which provides for forward motion of the bicycle with either forward or reverse rotation of the pedals. This embodiment is provided by adding specified equipment to a standard bicycle. The additional equipment is depicted within the dashed line 1 on FIG. 1A. FIGS. 1A and 1B show the standard bicycle parts relevant to this invention. Left pedal 2 and right pedal 3 are attached to pedal shaft 6 via pedal arms 4 and 5 respectively. Seat tube 12 and down tube 14 form the bicycle frame. Front wheel 8, drive wheel 10, drive chain 13 and pedal sprocket 15 are attached to the bicycle frame.

In this embodiment pedal shaft 6 has been extended with an adapter 29 so that the gear equipment shown in FIG. 1A can be added. Added parts are bevel gears 16 and 18 and reversing bevel gear 20. Reversing gear 20 is gear matched to gears 16 and 18 and rotates on reversing gear shaft 22 which rotates within bearings 24 mounted in frame 26 which is fixed to down tube 14 by clamp 28. Gear 16 is mounted on freewheeling clutch 17 which allows gear 16 to rotate freely (i.e. without applying power to the crank) in the counterclockwise direction about shaft 6 but rotate with and drive the shaft 6 (i.e. applying power to the crank) in the clockwise direction. Gear 18 is mounted on freewheeling clutch 19 which allows gear 18 to rotate freely in the clockwise direction about shaft 6 but rotate with and drive the shaft 6 in the counterclockwise direction. Gear 16 is fixed to rotate with pedal sprocket 15 by fastener 30. The pedal arms 4 and 5 are fixed to and rotate with the shaft 6. The sprocket 15 is mounted to rotate freely on the shaft 6 by a bearing 11.

When the bicyclist rotates pedals 2 and 3 in the clockwise direction, pedal shaft 6 rotates in the clockwise direction also. The clockwise rotation of pedal shaft 6 causes freewheeling clutch 17 to engage, which in turn causes bevel gear 16 to rotate in the clockwise direction in unison with pedal shaft 6. This action imparts a clockwise motion to pedal sprocket 15 through fastener 30 thus driving the chain 13, rear sprocket, and rear wheel 10 in the clockwise direction.

The forward rotation of bevel gear 16, in addition to imparting clockwise rotation to fastener 30, rotates bevel gear 18 in the counterclockwise direction through reversing gear 20. Freewheeling clutch 19 does not engage however, thereby allowing bevel gear 18 to rotate in the counter clockwise direction while pedal shaft 6 rotates in the clockwise direction.

When the bicyclist rotates pedals 2 and 3 in the counterclockwise direction, pedal shaft 6 rotates in the counterclockwise direction also. The counterclockwise rotation of pedal shaft 6 causes freewheeling clutch 19 to engage, thereby causing bevel gear 18 to rotate counterclockwise in unison with pedal shaft 6. The counterclockwise rotation of bevel gear 18 causes bevel gear 16 to rotate in the clockwise direction through reversing gear 20. Bevel gear 16 is able to rotate in the clockwise direction while the pedal shaft 6 rotates in the counterclockwise direction because freewheeling clutch 17 does not engage when pedal shaft 6 rotates counterclockwise. This action drives pedal sprocket 15 in the clockwise direction about bearing 11 while pedal shaft 6 rotates in the counterclockwise direction. As previously described, the clockwise rotation of bevel gear 16 causes the rear wheel 10 to rotate in the clockwise direction via fastener 30, chain sprocket 15, chain 13, and the rear sprocket.

No significant loss of energy or total bicycle efficiency results from the rotation of pears 18 and 20 when the pedals are rotated in the forward direction or the reverse direction. Due to some small pear losses there is some reduction in total bicycle efficiency but not much. We estimate this efficiency loss in the gears to be practically imperceptible.

Thus, with this improvement the bicyclist can pedal alternatively clockwise or counter-clockwise. The ways in which the bicycle can be pedalled with this embodiment include forward pedaling, reverse pedaling, scissors left side, and scissors right side (see FIG. 7.) This variety of the pedal rotation utilizes the leg and related muscle groups in slightly different ways which increases overall endurance and makes traveling long distances easier for the bicyclist.

Gears 16 and 18 are preferably sized to fit within the diameter of the existing crankcase. Persons skilled in the art will recognize that many other gear arrangements and sizes will work effectively. An appropriate housing for the gears should be provided using techniques well known in the art.

Kangaroo Stroke

Figure 2A:
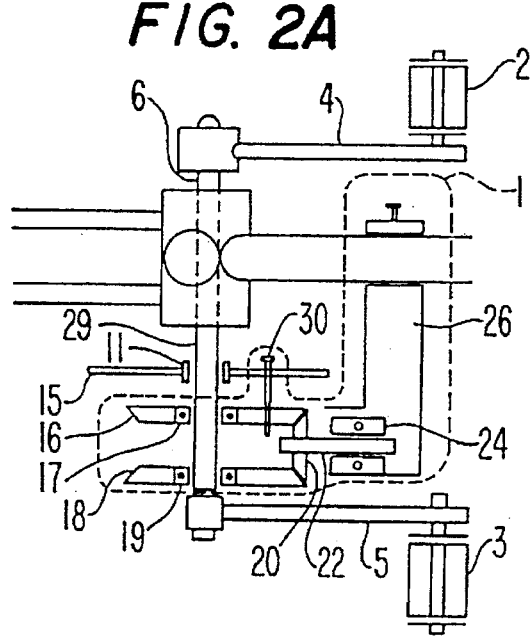
FIG. 2A is a top view of a bicycle frame and crankshaft shown partially in section with a second embodiment of the present invention incorporated thereon.
Figure 2B:
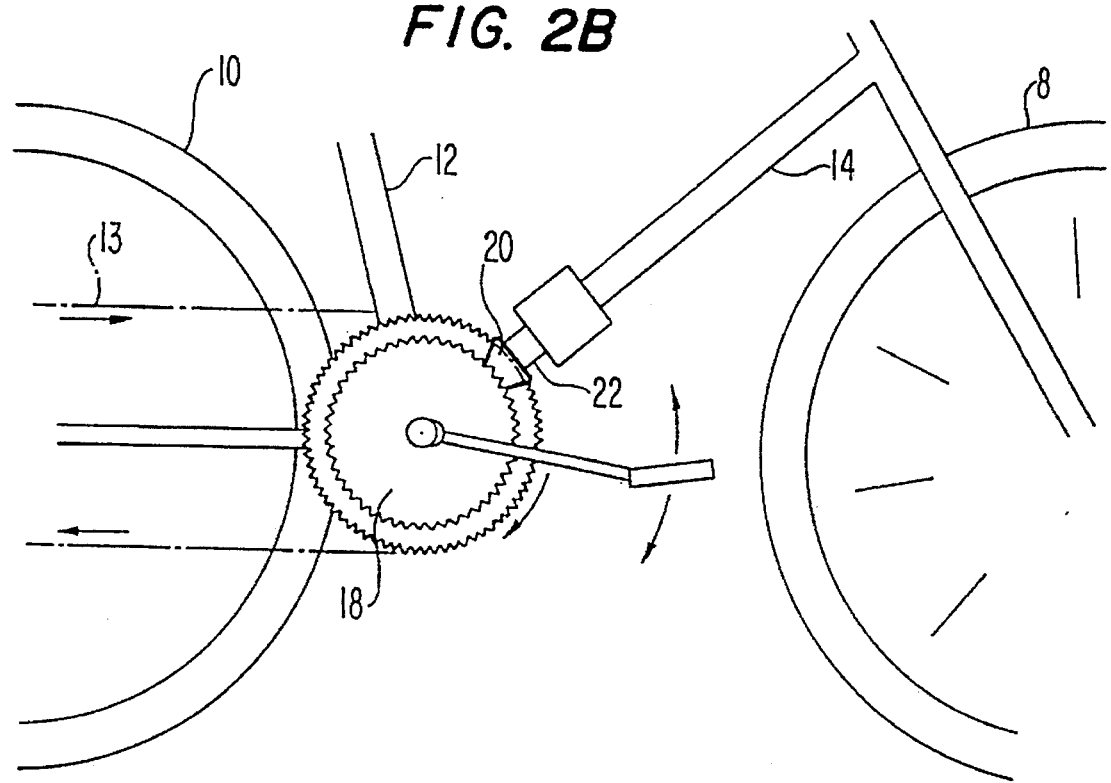
FIG. 2B is a side view of the bicycle frame and crankshaft of FIG. 2A.

FIGS. 2A and 2B show a slightly different embodiment using the same parts as shown in FIGS. 1A and 1B. FIGS. 2A and 2B differ from FIGS. 1A and 1B only in the position of the pedals. Specifically, in FIGS. 2A and 2B, both pedal arms 4 and 5 are parallel to each other and point towards the front of the bicycle. Pedal Arms 4 and 5 remain parallel to each other since each is fixed to pedal shaft 6.

In this embodiment, the bicyclist's shoes should be firmly attached to pedals 2 and 3. Commercially available equipment, such as toe clips or shoes which directly bolt to pedals 2 and 3, can be used to firmly attach the shoes to the pedals.

To propel the bicycle, the bicyclist simultaneously pushes down on pedals 2 and 3, then simultaneously pulls up on pedals 2 and 3. Both the downward stroke and the upward stroke impart power to rear wheel 10. Specifically, when the bicyclist pushes down on pedals 2 and 3, pedal shaft 6, which is fixed to pedal arms 4 and 5, rotates in the clockwise direction. The clockwise rotation of pedal shaft 6 causes freewheeling clutch 17 to engage, which in turn causes bevel gear 16 to rotate in the clockwise direction in unison with pedal shaft 6. As previously described, the clockwise rotation of bevel gear 16 causes rear wheel 10 to rotate in the clockwise direction via fastener 30, pedal sprocket 15, and chain 13.

When the bicyclist pulls up on pedals 2 and 3, pedal shaft 6 rotates in the counterclockwise direction. The counterclockwise rotation of pedal shaft 6 causes freewheeling clutch 19 to engage, thereby causing bevel gear 18 to rotate counterclockwise in unison with pedal shaft 6. The counterclockwise rotation of bevel gear 18 causes bevel gear 16 to rotate in the clockwise direction through the action of reversing gear 10. Bevel gear 16 is able to rotate clockwise around pedal shaft 6 which is rotating counterclockwise because freewheeling clutch 17 does not engage when pedal shaft 6 is rotating in the counterclockwise direction. The clockwise rotation of bevel gear 16 causes rear wheel 10 to also rotate in the clockwise direction via fastener 30, pedal sprocket 15, and chain 13.

If desired, limiters can be provided at 2:00 and 4:00 o'clock to limit movement of the pedals between the 2:00 and 4:00 o'clock position. Alternatively, the limiters can be arranged in other positions to provide a great variety of back and forth, clockwise or counterclockwise leg motions. Many of these options provide great exercise for the abdominal and gluteal and related muscles. Using this embodiment of the invention, the bicyclist can pedal the bicycle in the following modes: parallel forward, parallel backward, and rocker down (see FIG. 7).

Stair Climbing

Figure 3A:
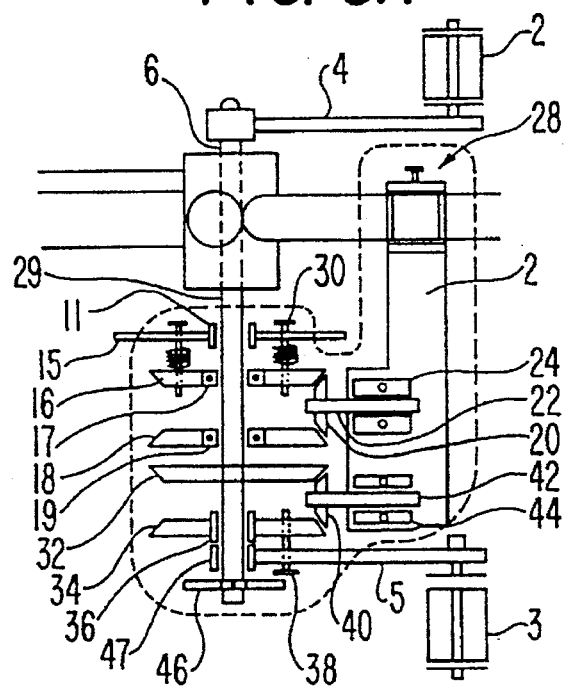
FIG. 3A is a top view of a bicycle frame and crankshaft shown partially in section with a third embodiment of the present invention incorporated thereon.
Figure 3B:
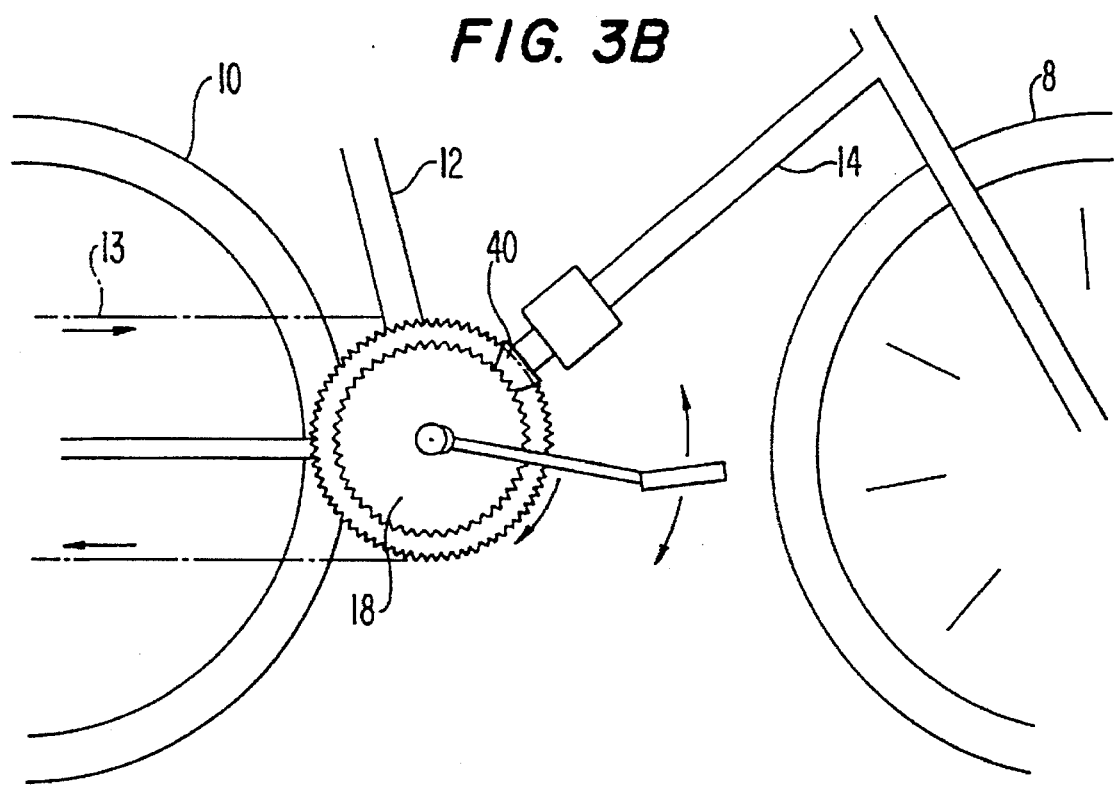
FIG. 3B is a side view of the bicycle frame and crankshaft of FIG. 3A.

FIGS. 3A and 3B illustrate an embodiment which provides for forward bicycle motion when pedals 2 and 3 simultaneously rotate in opposite directions which allows alternating reciprocating pedal motion to drive the bicycle forward. The alternating motions can be started from any major quadrant. This embodiment contains the parts shown in FIGS. 1A and 1B and two additional bevel gears 32 and 34 (similar to gears 16 and 18). It should be noted that both sets of gears are shown on the right side of the bicycle frame for the convenience of illustration only. Those skilled in the art will realize that one set of the gears could be placed on the left side of the bicycle, or both sets of gears could be placed within the housing of the lower bracket (crank case). Reversing idler gear 40 is matched to gears 32 and 34 and gear 40 rotates on reversing shaft 42 which in turn rotates within bearing 44 mounted in frame 2. Gear 32 is fixed to pedal shaft 6 and gear 34 rotates freely about pedal shaft 6 on bearing 36. Right pedal arm 5 also rotates freely about pedal shaft 6 on bearing 47. Because of the arrangement of gears 32 and 34, pedals 2 and 3 must of necessity rotate in opposite directions. Since gear 32 is engaged in gear 34, pedal 3 rotates in the direction opposite of the direction of rotation of pedal shaft 6 whereas pedal 2 rotates in the same direction as pedal shaft 6. Because of the above described arrangement, reciprocating motion of the pedals will produce forward motion of the bicycle. This embodiment is excellent for stair climbing type of leg motion to exercise gluteal and greater hamstring muscles in addition to the other leg muscles. Using this embodiment of the invention, the bicyclist can pedal the bicycle in the following modes: parallel alternating front, parallel alternating back, halfmoon alternating down, counter-rotational right, counter-rotational left, stair climbing forward, stair climbing backward, bidirectional right side and bidirectional left side (see FIG. 7). A limiter could also be engaged for limiting the alternating pedal movement between 7:00 and 11:00 o'clock and 1:00 to 5:00 o'clock respectively.

More specifically, when pedal arm 4 is driven in the clockwise direction, pedal shaft 6, which is fixed to pedal arm 4, also rotates in the clockwise direction. This action causes freewheeling clutch 17 to engage, thereby causing bevel gear 16 to rotate in the clockwise direction in unison with pedal shaft 6. The clockwise rotation of bevel gear 16 causes rear wheel 10 to also rotate in the clockwise direction via fasteners 30, pedal sprocket 15, and chain 13. The clockwise rotation of bevel gear 16 causes bevel gear 18 to rotate in the counterclockwise direction via reversing gear 20. Bevel gear 18 is able to rotate about pedal shaft 6, which is rotating in the clockwise direction, because freewheeling clutch 19 does not engage when pedal shaft 6 is driven in the clockwise direction.

When pedal arm 4 is driven in the counterclockwise direction, pedal shaft 6 also rotates in the counterclockwise direction. This action causes freewheeling clutch 19 to engage, thereby causing bevel gear 18 to rotate counterclockwise in unison with pedal shaft 6. The counterclockwise rotation of bevel gear 18 causes bevel gear 16 to rotate in the clockwise direction via reversing gear 20. Bevel gear 16 is able to rotate clockwise around pedal shaft 6 which is rotating counterclockwise because freewheeling clutch 17 does not engage when pedal shaft 6 is rotating counterclockwise. The clockwise rotation of bevel gear 16 causes-pedal sprocket 15 to rotate in a clockwise direction via fasteners 30. Pedal sprocket 15 is able to rotate in a clockwise direction around bearings 11 while pedal shaft 6 rotates counterclockwise. The clockwise rotation of pedal sprocket 15 causes rear wheel 10 to rotate clockwise via chain 13.

When pedal arm 5 is driven in the clockwise direction, bevel gear 34 also rotates in the clockwise direction via fastener 38 which is fixedly attached to pedal arm 5 and bevel gear 34. This action causes bevel gear 32 to rotate in the counterclockwise direction via reversing gear 40. Since bevel gear 32 is fixed to pedal shaft 6, pedal shaft 6 will rotate in the counterclockwise direction along with bevel gear 32. Pedal shaft 6 can rotate in the opposite direction of pedal arm 5 because pedal arm 5 rotates around pedal shaft 6 on bearing 47. The counterclockwise rotation of pedal shaft 6 causes freewheeling clutch 19 to engage, thereby causing bevel gear 18 to rotate counterclockwise in unison with pedal shaft 6. The counterclockwise rotation of bevel gear 18 causes bevel gear 16 to rotate clockwise via reversing gear 20. The clockwise rotation of bevel gear 16 causes rear wheel 10 to also rotate in the clockwise direction via pedal sprocket 15 and chain 13.

When pedal arm 5 is driven in the counterclockwise direction, bevel gear 34 also rotates in the counterclockwise direction via fastener 38. This action causes bevel gear 32 to rotate in the clockwise direction via reversing gear 40, which in turn causes pedal shaft 6 to rotate in the clockwise direction since bevel gear 32 is fixed to pedal shaft 6. The clockwise rotation of pedal shaft 6 causes freewheeling clutch 17 to engage, thereby causing bevel gear 16 and the pedal sprocket 15 to rotate in the clockwise direction.

With the above arrangement the bicyclist is able to drive the bicycle forward with alternate clockwise and counterclockwise strokes with the pedals 2 and 3 respectively.

Connecting the pedal arm 5 to flange 46 instead of gear 34 permits operation of the bicycle in a continuous mode with both pedals rotating in the same direction as described in the two previous sections. Since flange 46 and pedal arm 4 are fixedly attached to pedal shaft 6, pedal arm 4, flange 46 (and pedal arm 5 when it is attached to flange 46) and pedal shaft 6 always rotate in the same direction.

Exercise Bicycle

The bicycle could be mounted on a stationary exercise frame such as units marketed by Minoura and Blackburn Corporations. As a result most regular bicycles can be converted to a multiple variation exercise machine providing a very wide variety of exercise options.

Relative Pedal Positions

Persons skilled in the art will note that in all of the embodiments of the present invention discussed above, the pedals rotate at the same speed either in the same direction or different directions. In either case the relative starting positions can be important. These starting positions can be established in a wide variety of ways such as fixing the pedal arm at specific relative positions on pedal shaft 6 or on gear 34 or on flange 46.

Remote Adjustment of Pedal Position and Relative Pedal Rotation

Figure 5:
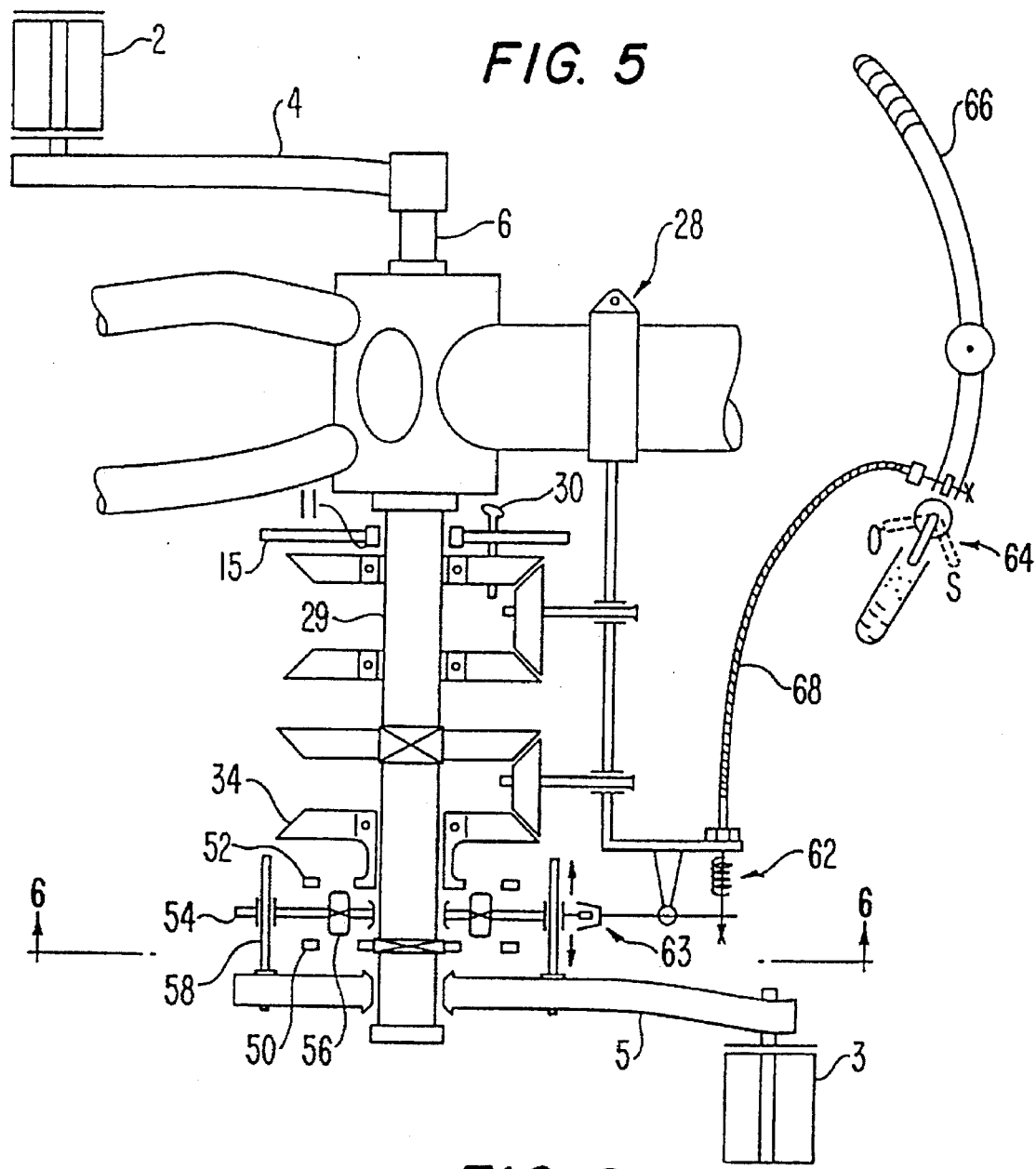
FIG. 5 is a top view shown partially in section of the embodiment of FIG. 3A modified to have a kinetic modes switching unit where forward or reverse pedaling and relative pedal positions are selected from the bicycle handlebar.
Figure 6:
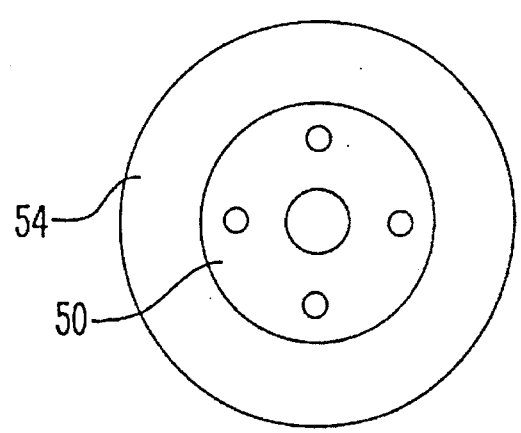
FIG. 6 is a sectional view taken along line 6—6 of FIG. 5 showing an assembly of positional discs and a control disc used in the kinetic mode switching unit.

It is feasible to provide for selection of relative pedal positions and relative direction of rotation at the will of the bicyclist while riding down the road. This can be done with a clutch-cable arrangement with controls at the handlebar as is shown in FIGS. 5 and 6. As shown in FIG. 5, the basic arrangement of the pedal shaft and the pears is the same as shown in FIGS. 3A and 3B. Positional discs 50 and 52 have been added along with control disc 54 and pins 56. Positional disc 52 is attached to pear 34 and turns freely on pedal shaft 6. Positional disc 50 is fixed to pedal shaft 6. Pedal arm 5 rotates freely on shaft 6 and through prongs 58 is slidably coupled to control disc 54. Axial movement of the control disc 54 along the shaft 6 is caused by shifting mechanism 62 which is remotely actuated through lever 64 mounted on the handlebar 66. Boden cable 68 provides the link between actuator 64 and the shifter 62. FIG. 6 shows a side view of the positional discs 50 as well as control disc 54. Positional discs 50 and 52 have four holes equally spaced from the central axis of the pedal shaft and represent the four major quadrants. Control disc 54 has two pins 56 which are 180 degrees apart and which match the holes in positional discs 50 and 52. The rim of control disc 54 is held in a particular position by shifting mechanism 62 through a slidable joint 63. As the bicyclist moves shifter 64, control disc 54 is axially displaced along pedal shaft 6. With shifter 64 at "O", engaging pins 56 engage into positional disc 52 for alternating pedaling (the right side pedal moves in the rotational direction opposite that of the left pedal and the pedal shaft). This action results from the fact that positional disc 52 is fixed to bevel pear 34, and therefore rotates in the same direction as bevel gear 34. When pedal shaft 6 rotates in the clockwise direction, bevel gear 34 rotates in the counterclockwise direction, thereby causing positional disc 52 to rotate in the counterclockwise direction, thereby dictating that pedal arm 5 rotate in the counterclockwise direction because it is connected to control disc 54 via pins 58. When shifter 64 is moved to the S position, engaging pins 56 engage into positional disc 50 for continuous forward or reverse pedaling (the right side pedal moves in the same rotation direction as the pedal shaft and the left pedal). Since positional disc 50 is fixed to pedal shaft 6, positional disc 50 rotates in the same direction as pedal shaft 6. With control disc 54 engaged with positional disc 50, control disc 54 rotates in the same direction as positional disc 50, thereby rotating pedal arm 5 in the same direction as pedal arm 4 via pins 58. While shifter 64 is in the neutral position N the pedals can be moved to any position relative to each other. However, when shifter 64 is in the neutral position pedal arm 5 is unable to impart any force to the gears of the invention.

Wide Variety of Options

Figure 7:
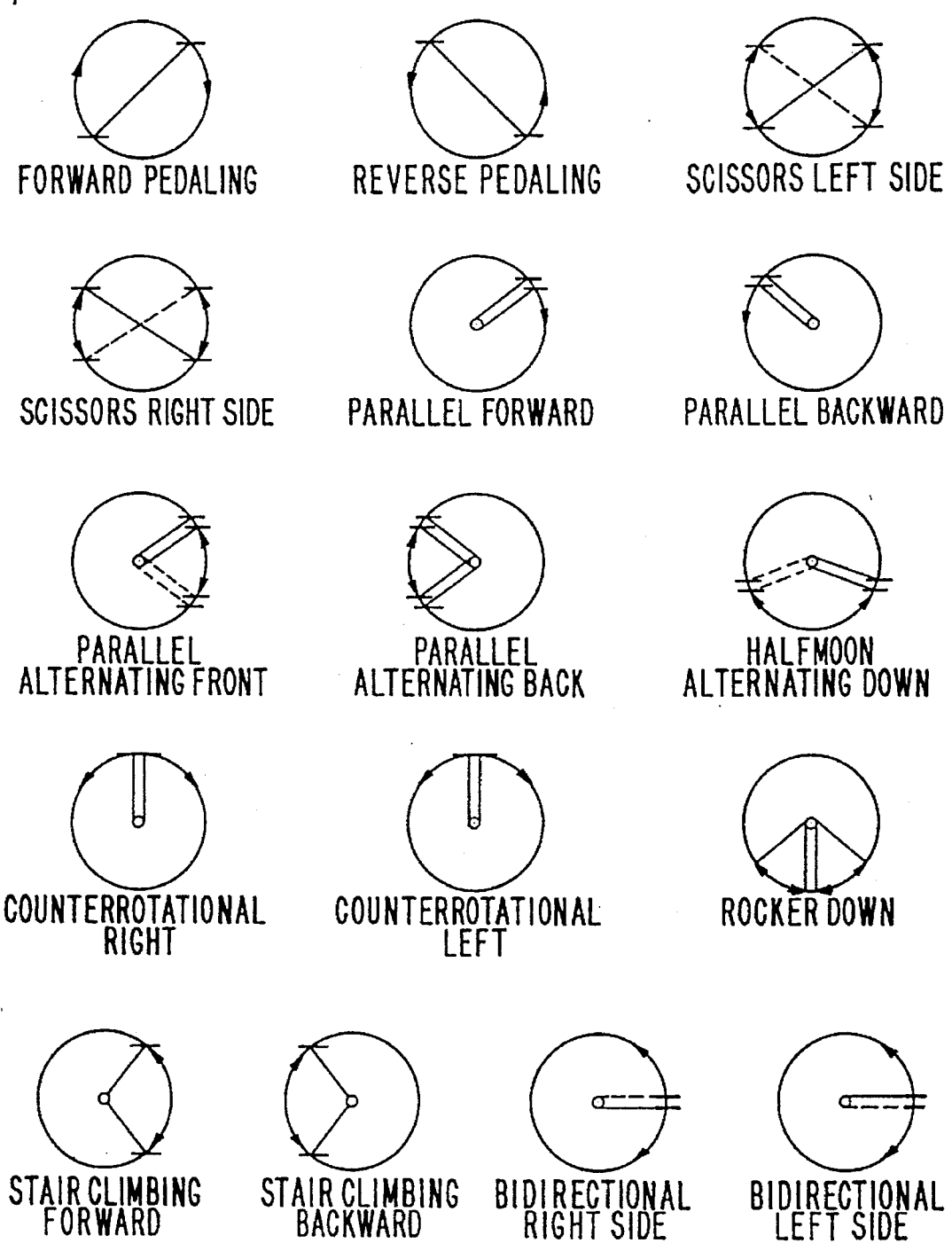
FIG. 7 shows a variety of pedaling positions which can be performed with the present invention.

FIG. 7 summarizes some of the wide variety of pedaling options available with this invention.

Other Gear Arrangements

Figure 4:
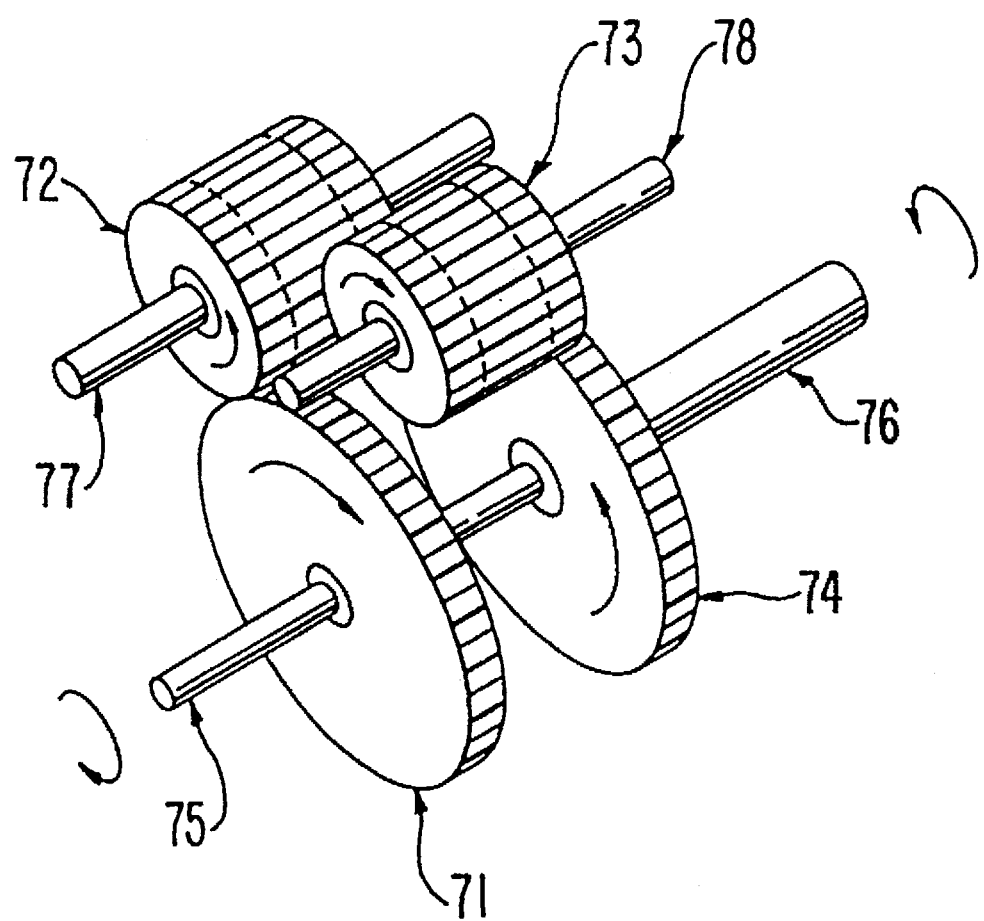
FIG. 4 shows an alternative configuration of spur gears which can be used to implement reverse pedaling in the embodiments of FIGS. 1–3.

Although the present invention has been described above making use of bevel gears, persons skilled in this art will recognize that many other gear arrangement could be used with essentially equivalent results. One preferred alternative would be to use spur gears to achieve the reversing effects described above. FIG. 4 illustrates how the reversing effects are achieved with spur gears. Drive shaft 75 is fixed to gear 71, which engages idler gear 72 rotating on shaft 77. Gear 72 has an enlarged width relative to that of gears 71 and 74. Idler gear 73 which rotates on shaft 78 engages idler gear 72 as well as gear 74. Idler gear 73 has an enlarged width compared to gears 71 and 74. Output shaft 76 is fixed to gear 74 and is concentric to input shaft 75. Spacing between idlers and gears 71 and 74 are such that they never interlock themselves with each other, in this way achieving concentric reverse rotation between input shaft 75 and exit shaft 76. Persons skilled in the art will also recognize that these reversing effects can also be accomplished with a chain and sprocket arrangement. In fact Applicants built their first proof of principal demonstration model using a chain and sprocket unit which worked reasonably well.

While the above description contains many specificities, the reader should not construe these as limitations on the scope of the invention, but merely as exemplification's of preferred embodiments thereof. Those skilled in the art will envision many other possible variations which are within its scope. Accordingly the reader is requested to determine the scope of the invention by the appended claims and their legal equivalents, and not by the examples which have been given.

We claim:

1. A pedal mechanism for attachment to a bicycle having a drive wheel and a drive chain, said drive wheel being caused to rotate clockwise, when viewed from the right side of said bicycle, by a clockwise force provided through said drive chain, comprising:

a pedal shaft;

pedal arms mounted on said pedal shaft;

pedals mounted on each one of said pedal arms;

first gearing means for interconnecting said pedal arms and said pedal shaft to cause said pedal arms to rotate in the opposite direction with respect to each other while rotating said pedal shaft in the same direction of rotation as one of said pedal arms and in the opposite direction of rotation from the other one of said pedal arms, and second gearing means for interconnecting said pedal shaft and said drive chain to cause a clockwise force to be applied to said drive wheel when said pedal shaft is driven in a clockwise direction by said pedal arms and to cause a clockwise force to be applied to said drive wheel when said pedal shaft is driven in a counterclockwise direction by said pedal arms.

2. The pedal mechanism for attachment to a bicycle as recited in claim 1, wherein said first gearing means comprises a gear fixedly attached to said pedal shaft and directly driven by one of said pedal arms and a reversing gearing mechanism interconnecting said gear and the other one of said pedal arms.

3. A pedal mechanism as recited in claim 1, wherein said second gearing means comprises a first gear, a first clutch means for mounting said first gear on said pedal shaft to permit said first gear to rotate freely in one direction about said pedal shaft and to rotate with and be driven by said pedal shaft in the opposite direction to said one direction, a second gear, a second clutch means for mounting said second gear on said pedal shaft to rotate freely in said opposite direction about said pedal shaft and to rotate with and be driven by said pedal shaft in said one direction, means to interconnect said first and second gears to cause said first and second gears to rotate in opposite directions with respect to said pedal shaft, and means connecting said first gear to said drive chain to apply a clockwise force to said drive wheel when said first gear is driven in said opposite direction by said pedal shaft through said first clutch means or by said pedal shaft through said second clutch means through said reversing means.

4. A bicycle comprising:

a pedal shaft;

two pedal arms mounted on said pedal shaft;

pedals mounted on each one of said pedal arms;

a pedal sprocket mounted on said pedal shaft;

a drive chain coupled to said pedal sprocket;

a drive wheel, said drive wheel coupled to said pedal sprocket via said drive chain; and a gearing means comprising at least six gears, defining a first gear, a second gear, a third gear, a fourth gear, a fifth gear and a sixth gear, said first gear and said second gear being positioned to rotate about said pedal shaft in directions opposite each other and said fourth gear and said fifth gear being positioned to rotate about said pedal shaft in directions opposite each other so as to permit a clockwise force to be applied to said drive wheel with one of said pedals rotating in a clockwise direction and the other pedal rotating in a counterclockwise direction.

5. A bicycle as in claim 4, wherein said fourth gear is fixedly attached to said pedal shaft.

6. In a pedal driven vehicle, a pedal shaft having an axis;

pedal arms mounted on said pedal shaft to drive said pedal shaft in the clockwise or counterclockwise direction;

pedals mounted on each one of said pedal arms; and driving means to cause the forward movement of said vehicle when said pedal shaft is driven in a clockwise direction and to cause forward movement of said vehicle when said pedal shaft is driven in a counterclockwise direction;

said driving means comprising first and second gears mounted on said pedal shaft to rotate about said axis, a third gear driven by one of said pedal arms and mounted for free rotation on said pedal shaft, a fourth gear fixed to said pedal shaft, and gearing means coupled to said third and fourth gears to cause said third and fourth gears to rotate about said axis in opposite directions.

7. A pedal driven vehicle according to claim 6, wherein said first gear and said second gear are coupled to each other via gearing means such that said first gear and said second gear rotate about said axis in opposite directions.

8. A pedal driven vehicle according to claim 6, wherein said gears and said gearing means are bevel gears.

9. A pedal driven vehicle according to claim 6, wherein said gears and said gearing means are spur gears.

10. A pedal driven vehicle according to claim 6, wherein said driving means further comprises a pedal sprocket mounted to rotate about said axis.

11. A pedal driven vehicle according to claim 10, wherein said first gear is attached to said pedal sprocket so that said first gear and said pedal sprocket rotate together about said axis.

12. A pedal driven vehicle according to claim 10, wherein said driving means further comprises means to drive said vehicle forward in response to rotation of said pedal sprocket in a clockwise direction.

13. A pedal driven vehicle according to claim 6, wherein said first gear is mounted on said pedal shaft by a clutch means so as to permit said first gear to rotate freely in a counterclockwise direction about said pedal shaft and to rotate with and be driven by said pedal shaft in a clockwise direction while applying a driving force to said vehicle.

14. A pedal driven vehicle according to claim 12, wherein said second gear is mounted on said pedal shaft by a clutch means so as to permit said second gear to rotate freely in a clockwise direction about said pedal shaft and to rotate with and be driven by said pedal shaft in a counterclockwise direction while applying a driving force to said vehicle.

15. A pedal mechanism according to claim 13, wherein said driving means further comprises a pedal sprocket mounted to rotate freely on said pedal shaft and means fixing said first gear to said pedal sprocket so that said first gear and said pedal sprocket rotate together on said pedal shaft.

16. A pedal driven vehicle as recited in claim 6, wherein one of said pedal arms is mounted to rotate freely relative to said pedal shaft and including reversing means to drive said pedal shaft in a clockwise rotation in response to counterclockwise rotation of said one of said pedal arms about said pedal shaft and to drive said pedal shaft in a counterclockwise direction in response to clockwise rotation of one of said pedal arms about said pedal shaft.

17. A pedal driven vehicle as recited in claim 16, further comprising means to selectively couple said one of said pedal arms to said pedal shaft to drive said pedal shaft to rotate in the same direction as the rotation of said one of said-pedal arms or to couple said one of said pedal arms to said reversing means to cause said pedal shaft to rotate in the opposite direction to the rotation of said one of said pedal arms.

18. A pedal mechanism for driving a vehicle comprising:

a pedal shaft;

a left pedal arm, one end of which is mounted on said pedal shaft;

a right pedal arm, one end of which is mounted on said pedal shaft;

a left pedal mounted on said left pedal arm;

a right pedal mounted on said right pedal arm;

a first gear mounted on said pedal shaft by a free-wheeling clutch to rotate freely on said pedal shaft in a counterclockwise direction and to rotate with and be driven by said pedal shaft in the clockwise direction;

a second gear mounted on said pedal shaft by a free-wheeling clutch to rotate freely on said pedal shaft in a clockwise direction and rotate with and be driven by said pedal shaft in a counterclockwise direction;

a third gear coupled to said first and second gears to cause said first and second gears to rotate in opposite directions on said pedal shaft;

a fourth gear mounted to rotate freely on said pedal shaft;

a fifth gear fixed to said pedal shaft; and a sixth gear coupled to said fourth and fifth gears to cause said fourth and fifth gears to rotate in the opposite directions with respect to the axis of said pedal shaft.

19. A pedal mechanism as recited in claim 18, wherein said right pedal arm is mounted to be freely rotatable on said pedal shaft, and further comprising means for coupling said right pedal arm to rotate with and drive said fourth gear.

20. A pedal mechanism as recited in claim 19, further comprising slidably coupled means so said right pedal arm either rotates with and drives said fourth gear, or said right pedal arm rotates with and drives said pedal shaft.

21. A pedal mechanism as recited in claim 20, wherein said slidably coupling means comprises:

a lever;

a control disk;

a first positioning disk;

a second positioning disk; and a cable having two ends, one of said ends being connected to said lever, and the other of said ends being connected to said control disk;

said control disk engaging either said first positioning disk or said second positioning disk depending on the position of said lever.

\* \* \* \* \*